United States Patent [19]

Power

[11] 4,076,566

[45] Feb. 28, 1978

[54] METHOD OF PREPARING DECORATIVE TEXTURED LAMINATES

[75] Inventor: George Edward Power, Cincinnati, Ohio

[73] Assignee: Formica Corporation, Cincinnati, Ohio

[21] Appl. No.: 653,064

[22] Filed: Jan. 28, 1976

[51] Int. Cl.² .................. B32B 31/20; B24C 1/10; B32B 27/42
[52] U.S. Cl. .................. 156/153; 51/319; 72/53; 156/220
[58] Field of Search .................. 156/219, 220, 153; 72/53; 101/3 R, 17, 463, 453, 454, 32; 51/310, 311, 318, 319, 320, 321

[56] References Cited

U.S. PATENT DOCUMENTS

| | | | |
|---|---|---|---|
| 3,526,558 | 9/1970 | Beeson | 156/219 |
| 3,558,395 | 1/1971 | Plegat | 156/153 |
| 3,763,602 | 10/1973 | Boettcher | 72/53 |
| 3,825,462 | 7/1974 | Ettel | 156/219 |
| 3,928,527 | 12/1975 | Wohnhaas et al. | 156/219 |

*Primary Examiner*—William A. Powell
*Assistant Examiner*—Thomas Bokan
*Attorney, Agent, or Firm*—Frank M. Van Riet

[57] ABSTRACT

A process of preparing textured, decorative laminates is disclosed wherein the laminate assembly is heat and pressure consolidated in conjunction with a press plate having a specific roughness and gloss comprising its textured surface.

4 Claims, No Drawings

METHOD OF PREPARING DECORATIVE TEXTURED LAMINATES

BACKGROUND OF THE INVENTION

For many years decorative laminates have been used as a surfacing material in residential and commercial structures wherein aesthetic effects are desired in combination with functional behavior such as wear, heat and stain resistance. Typical applications of said laminates are surfacing for walls, partitions, table tops, counter tops, furniture, doors and the like. Such decorative laminates generally are produced from a supporting base member, usually either a particleboard product or a plurality of resin impregnated core sheets usually composed of kraft paper which has been impregnated with a thermosetting resin and, more particularly, with a thermosetting water-soluble or water-insoluble phenolic resin, and a decorative sheet. When the kraft paper has been impregnated with the thermosetting resin, the sheets are dried and cut to the appropriate size. Thereupon, a plurality of these resin impregnated sheets are stacked in a superimposed relationship. The number of plies or sheets in the stack depends on the ultimate intended use of the laminate. For most purposes, the number of plies of these core sheets will total about six to nine but can total as many as 12–15. When particleboard is used, the material preferred is that produced from thermosetting resin impregnated wood chips which are heat and pressure consolidated into a composite structure. This particleboard is usually also referred to as flakeboard, chipboard, etc. and is well known in the art.

There is then placed on the stack of core sheets or particleboard, the decorative sheet which is generally a sheet of alpha-cellulose paper which bears a printed design or has a light color and is impregnated with a noble thermosetting resin which is not subject to significant darkening upon the application of heat. Suitable resins for the decorative sheets are the aminotriazine resins and more particularly the melamine-formaldehyde resins, the benzoguanamine-formaldehyde resins, the unsaturated polyester resins and the like. It is generally desirable, when making these decorative laminates, especially those produced with the kraft core sheets, to make use of a protective overlay sheet which is placed atop and is similar to the decorative sheet but is generally devoid of any design and, in the final laminate, is transparent. The superimposed laminate components are then inserted into a laminating press and are heat and pressure consolidated to a unitary structure. During the consolidation step, the thermosetting resins are converted to the thermoset state thereby providing an extremely hard, attractive and permanent laminated product. For obvious economic reasons, it is common practice, especially when producing the kraft paper supported laminates, to consolidate a plurality of these individual laminating assemblies into one large assembly, or press pack, said stacks being separated from one another by a release sheet, and then to subject this pack to heat and pressure consolidation.

In consolidating the laminate components according to the original, most widely practiced techniques, each individual assembly is placed with its decorative overlayment surface adjacent to a highly polished stainless steel press plate. The function of the press plate is twofold. First, it provides a smooth, defect-free surface to one side of the laminate. Second, in connection with the kraft paper based supported systems, it serves to separate pairs of back-to-back assemblies, thus permitting a plurality of these assemblies to be consolidated into laminates in one operation, usually in back-to-back relationship. In the art, the kraft paper base supported laminates are referred to as "high pressure" laminates, obviously because of the pressure used during the consolidation processes.

The surfaces of laminates produced in this manner are generally very glossy, and, as time passed, the consumer desired a less glossy surface. In the earliest days of the high pressure laminating art, the smooth, glossy surface produced during the pressing operation was reduced to a matte or less glossy finish by rubbing the surface with pumice, originally in an oil slurry, but more recently in a water slurry. For the purpose of this discussion such a flat, smooth, but reduced-in-gloss surface will be referred to as a "Class I" surface. A slightly textured surface can be produced by pressing the laminate surface against an aluminum foil caul stock, as is explained more fully below. Such a surface will be herein called a "Class II" surface and is described as "mini-textured" because the hilltop-to-valleybottom depths of such textures are from about 0.5 mil (0.0005 inch) to about 1.0 mil (0.001 inch). Somewhat coarser textures, sometimes called "low-relief" surfaces, can be produced by a printing process known as the "heavy ink method" such as is described in U.S. Pat. No. 3,373,068. These textures have hilltop-to-valleybottom depths of about 3 to 5 mils and will be herein called "Class III" surfaces. Finally, a very heavily textured surface can be produced by the methods of U.S. Pat. Nos. 3,860,470 and 3,718,496. The hilltop-to-valleybottom depths of these textures are of the order of 20 mils. These textures will be herein called "Class IV" surfaces.

To recapitulate the above:

| Class | Mode of Generation | Roughness Micro Inches | Hilltop-to-Valleybottom Depth Mils |
|---|---|---|---|
| I | Pumice Rub | 8–35 | Not Applicable |
| II | Aluminum Caul Stock | 50–120 | 0.5–1.0 |
| III | Heavy Ink | — | 3–5 |
| IV | "Substitute Caul" | — | About 20 |

The Class II surfaces have proven to be of special importance because they are attractive to the touch, yet serve to overcome "telegraphing" of joints, glue lines, coarse grain and other discontinuities which may occur in modern furniture structures, especially those which use frame construction as opposed to solid panels, e.g., in a table top. "Telegraphing" is used in the industry to describe and define the ability of a plastic sheet to reproduce in its upper surface whatever texture may be possessed by the substrate upon which it rests. Thus, for many years, the best practice in mounting high pressure laminates was to use smooth-surfaced, hardwood-faced plywood, usually birch or maple. With the advent of reconstructed wood particleboard for laminate substrates, it became the accepted practice to use three-layer construction which featured a smoothly sanded layer of "fines" on the bondable surfaces thereof to eliminate "telegraphing".

Furniture manufacturers learned that the Class II surfaces, described above, tolerate a much rougher substrate gluing surface and yet do not exhibit "telegraphing". This is because the Class II surfaces are not strictly flat, but have a slight texture which disguises the effects of "telegraphing" so that it is no longer noticeable to the viewer.

It should be understood that a Class II surface is only mildly textured and that the ultimate furniture user will not be unduly aware of the depth of the texture. For instance, such a textured laminate will provide a suitable writing surface if used as a desk top.

Class III and IV surfaces will also eliminate "telegraphing", but represent such departures from even approximate planarity that aesthetic requirements are violated and the utility expected of such approximately planar surfaces is absent.

Because of this unique dimension in texture, i.e., one which is coarse enough to hide "telegraphing", yet smooth enough to be accepted as planar, the "mini-textured" surface laminates have enjoyed great popularity and now account for over 50% of all the commercial laminates produced in the United States.

Earlier investigators used either embossed, machined or etched three dimensional metal press plates in making such decorative laminates, directly from these plates.

Embossed plates require the preparation of an embossing die or roll which in itself is expensive; but embossed patterns must be at least 0.002 inch in depth in order to compensate for wear on the die which will otherwise alter the character of the embossed pattern. Plates produced by machining are usually limited to geometrical patterns. The machining operation is slow and costly and not well suited to the preparation of a large quantity of plates; machined plates or dies are usually made in small numbers but are used to produce many pressings, usually in the millions. Etched plates are well known, but the cost of the etching baths, photographic equipment etc. requires an extensive capital outlay. Moreover, the process is critical and demands highly skilled artisans to carry it out. For the reasons mentioned, each of these processes is costly to begin with but may be even more costly from the standpoint of maintenance of the finished plate. These plates unavoidably become damaged through handling in normal use. Such damage is not due to any factor inherent in the process such as wear, corrosion, fatigue etc., but due to accidental events such as scratching, bending, burnishing and the like when the plate comes into undesired contact with other hard, sharp or abrasive objects. A small scratch only an inch or two in length can render useless an entire press plate of 5 feet × 12 feet dimensions. It is therefore of great importance that such plates be capable of easy repair. This is not true of embossed, machined, or etched plates which cannot be re-cycled through the process which originally produced them. The peening process described herein for producing the plates used in the instant invention, however, can be carried out repeatedly on the same plate to produce the identical texture at very low cost.

Other investigators proposed making the plates out of materials other than metal having the desired configuration but these were not satisfactory because of the failure, in one way or another, of these materials during the high temperatures and pressures used in laminating.

Aluminum foil bonded to paper, i.e., aluminum foil caul stock, especially in the production of the high pressure laminates, has been used, as is mentioned above, for about the last ten years as a texturizing medium in the production of textured laminates. This paper-foil combination is inserted between the overlay sheet and the press plate with the foil side adjacent to the overlay sheet as described by Ingram O. Robertson, Jr., "Use of Aluminum Foil Release Sheets in Decorative Laminates", TAPPI Plastics-Paper Conference, Chicago, 1971, or TAPPI Journal, Vol. 55, pages 1341–1344, 1972. Various textures can be generated in the laminates by choice of the finish on the foil and the texture of the paper used to back it.

Two of the particular combinations of aluminum foil and paper have become especially popular. Both combinations employ 0.0005 inch, matte finish, 1235 alloy aluminum foil. In one case, the foil is laminated to a 40 lb., machined-glazed natural paper. In the other case, a coated litho paper of about the same weight is laminated to the foil.

Unfortunately, aluminum foil caul stock is relatively expensive and during more recent years attempts have been made to find cheaper substitutes. One of the most common replacements employed is a glassine paper coated with a smooth layer of polymeric material containing a release agent. This material, although less costly than caul stock, produces laminates whose cleanability is poorer than those produced from caul stock and which are more prone to a surface irregularity common to both high and low pressure laminates called "mottle" which is caused by the paper used in the glassine release sheet. Apparently, caul stock successfully masks the structure of the paper to which it is bonded and thus reduces, although does not eliminate, mottle, while glassine does not. The glassine sheet is also much more flexible than the caul stock and hence often wrinkles during the laminate assembly operation, leading to rejected products. Furthermore, the glassine type of material also suffers because of the lack of uniformity in the gloss of the polymer release coating thus producing variable laminate surfaces.

Attempts to reuse caul stock after one pressing have proven futile because of the necessity for careful cleaning of the foil between uses and the rapid deterioration thereof due to creasing, etc. thereof. Attempts to use harder foil only reduced the onset of the deterioration.

A further investigation of press plates, in an attempt to eliminate the necessity for using caul stock, has also proven unsuccessful. Commercially available embossed steel plates were found to be wanting because the embossments thereon were too deep and shallower embossments could not be produced because the pattern on the embossing roll used to emboss the plates would not wear well enough to produce sufficient plates to make the operation viable.

A commercially successful flame-spraying technique which would result in press plates of the proper roughness and gloss required to produce the ultimate laminates has also been considered. In this process, stainless steel plates were coated with metal and metal oxides by flame spraying to yield plates covered with thousands of small, spherical particles and resembling sandpaper in appearance. The plates appeared to be satisfactory with regard to roughness but when modification of the gloss was attempted, they could not be made uniform on both the hilltops and the valleys. Laminates produced therefrom were of poor surface quality.

SUMMARY OF THE INVENTION

I have now discovered that hard, stainless steel, press plates whose surface has been textured by peening with substantially spherical steel shot and whose gloss may be independently modified, if necessary, by further overpeening the initial texture, can be used in the production of laminates of superior surface quality.

The peening of the press plates is conducted by using large shot which imparts to their surface the essential texture and gloss and, where required, a second blasting with smaller shot or very light overblasting with sand can be used to further reduce the gloss.

Laminates manufactured from these plates are of excellent textured surface quality in that the grayness attendent the use of caul stock, especially in solid, dark color laminates is greatly reduced and the mottling, normally present is omitted. Because of the hardness of the plates, they resist damage through handling in the manufacturing process.

DESCRIPTION OF THE INVENTION INCLUDING PREFERRED EMBODIMENTS

As mentioned above, I have now discovered a novel method for producing textured laminates from properly prepared press plates, and the said textured laminates, per se. The laminates are superior to those produced heretofore since they are substantially free of grayness, i.e., they are at least about 90%, and approach 100%, free of grayness. They, furthermore, exhibit no undesirable mottling and have an improved stain resistance due to the fact that the desired surface gloss thereof can be attained directly from the laminating press and no further surface treatment is necessary, such as rubbing with pumice, which, of necessity, fractures the protective resin surface which decreases stain resistance. Furthermore, the problem of disposal of the texturing-release sheet (whether aluminum caul stock or coated paper) is eliminated as well as the original cost of the release sheet.

Grayness in textured laminates is believed to result from the surface treatment of the laminate after removal thereof from the press in an attempt to produce a more desirable surface gloss. A laminate pressed from a smooth, polished plate will appear to possess a deep, rich surface and will not vary in color from the color of the print layer below it. When such a laminate is rubbed with pumice, as discussed above, to reduce its surface gloss, thereby reducing glare and rendering the laminate more aesthetically acceptable in certain applications, many thousands of minute scratches are made on its surface. Each of these scratches scatters a small amount of light at the surface. The scattered light is usually white light. Therefore, the observer is viewing the background color through a curtain of white light and the surface appears to have a gray cast and the background color seems to have varied. In effect, the white light which is scattered is mixed with the light from the background color and that color then appears to be a lighter tint of the original.

If the production of a low gloss laminate is attempted by first rubbing the polished steel plate with pumice, one finds that this laminate also exhibits grayness. This result occurs between the thousands of scratches imparted to the press plate by the pumice rubbing have been molded with very high fidelity into the resin surface of the laminate. Etching of the polished plate also results in grayish laminates because the light scattering character of an etched surface is even more pronounced. Sand blasting the plate surface with particles of silica or alumina etc., which possess many sharp angles, produces a light scattering so that only very limited gloss reduction of the plate and/or laminate takes place without producing an undesirable gray cast.

Severe gloss reduction on the plate by sand blasting can cause such intense light scattering that the underlying pattern on the print paper may be totally obscured. It will be understood that the sandblast may be airborne, thrown from a wheel, gravity impinged or otherwise accomplished. The final result will be the same because the abrasive particles have sharp or pointed edges etc.

I have found, according to the present invention, that grayness in laminate surfaces can be substantially eliminated by peening the metal press plate surface with particles which are substantially smooth and rounded such as metal shot or balls, etc., having radii of curvature of about 0.003 to about 0.050 inch. The smooth, spherical particles distort the plate surface to provide the contour required therein in the form of craters but do not scratch it. Thus, no light scattering occurs. Since the surface of the plate is no longer flat, light is reflected from these hemispherical craters at many different angles and the gloss seems to have been reduced since the viewer can no longer see all the reflected light from a single angle of view.

The peened plates used in the present invention have a surface covered with a myriad of tiny craters having radii of curvature identical to those of the peening particle used, the interior surfaces of which are curved and hence do not produce planar mirror-image reflections, but are nevertheless smooth enough so that grayness is not exhibited in the laminate produced therefrom.

Mottling, on the other hand, is a slight variation in surface gloss across the surface of a laminate which creates lighter and darker areas in the eyes of the observer when viewing the laminate surface. The basic cause of mottling is believed to be due to the paper used in the texture release sheet, e.g., the caul stock. The amount of paper fiber present in each small section across the sheet varies from area to area during its production. Because of this, the amount of compressive force transmitted by each section varies. Those sections which are beneath a greater mass of cellulosic fibers will have full pressure transmitted whereas those under areas deficient in fibers will sustain less pressure. More precisely, the total force which goes into the production of the laminate tends to be supported by the higher spots in the paper and this force is bridged from one high point to the next. This variation in pressure causes the variation in surface gloss which, in turn, is defined as mottling. In the case of polymer coated release paper, mottling is increased by the tendency of the polymeric coating to flow more readily into the high or low pressure spots created by the release paper formation. Thus the contrast in gloss is increased and the mottling appears to be worse because it is more noticeable. Aluminum foil caul stock lessens the contrast because it behaves in substantially the same manner regardless of high or low pressure spots but it still produces undesirable areas of mottling.

The textured peened press plates used in the instant invention produce laminates which are entirely free of mottling because they are incompressable relative to the laminate components. They, therefore, force the laminates to compress uniformly over their entire surface, resulting in a uniform gloss and no mottle.

Shot peening has long been recognized in the art as a method for treating metal surfaces. It is a method of cold working in which compressive stresses are induced in the exposed surface layers of metallic object by the impingement by a stream of shot directed at the metal surface at a high velocity and under controlled conditions, see "Shot Peening", The ASM Committee on Shot Peening, Metals Handbook, 8th Ed., Vol. 2, pages 398-405, 1964, American Society for Metals, Metals Park, Ohio.

It will be apparent to those skilled in the art of metal working that numerous means exist for creating metal plates which are covered with a myriad of spheroidal craters whose interior surfaces are relatively smooth and which do not scatter light over microdimensions of that spheroidal surface. Some of these methods are listed below:

1. Peening with a hand-held hammer or similar tool to produce spheroidal craters, the craters being larger for a given striking force as the metal becomes softer. "Hammered" copper, brass, pewter and aluminum are produced by this method.

2. Embossing by means of a roll or die. If the texture in the embossing die is itself smoothed and rounded, the metal will assume the same configuration (in intaglio image). Soft steel and aluminum sheeting are commonly produced by this method.

3. Producing an electrotype from a surface, which may be non-metallic, but which has the desired smooth, but wavy surface. For instance, by electrotyping from the surface of a laminate produced from aluminum foil cauls, filling the electrotype with type metal to produce a plate about 1/10 inch thick and using this plate to produce further laminates by conventional pressing. The laminate so produced is indistinguishable from the one used to prepare the electrotype.

4. Peening by propelling shot, glass beads or other rounded projectiles at the surface of a metal plate. The basis of this method is described in the above-disclosed ASM, Metals Handbook.

5. Peening by means of a rotary flap wheel containing spheroidal particles as disclosed in U.S. Pat. No. 3,857,750.

Numerous other arrangements could be used to create spheroidal indentations in metals by propelling, dropping or striking the metal surface with a rounded implement.

In choosing the most desirable method of producing the plates used herein, it should be understood that it has been the practice for many years in the high pressure laminating industry to use press plates made of 410 stainless steel which is so hard (about 35–45, Rockwell "C" scale) that it can be worked only by the application of high energy impactions. The shot blasting technique of Method 4 described above is especially useful for the purpose and is, in fact, preferred because it generates textures of considerable depth, yielding roughnesses of up to about 200 microinches. While the flap-wheel peening of Method 5 is useful in limited cases, it usually requires repeated processing of 410 stainless steel to produce textures which have a roughness of only about 16-22 microinches.

In order that the nature of the plate may be better understood, there are described below certain techniques of abrading and texturing plates which are essentially unsatisfactory.

1. As noted earlier, embossing by roller or die is unsatisfactory because metal plates as hard as 410 stainless steel are virtually non-embossable by such a method due to deterioration of the embossing roll.

2. The electrotype method is extremely costly, limited to relatively small areas (a few square feet) and also is not applicable to hard stainless steel.

3. The pumice rub process, wherein rotating, stiff bristle brushes rub a slurry over the laminate as it moves beneath the brushes, creates thousands of tiny scratches too small to be resolved by the human eye. The force applied to the brushes, the particle size, concentration and hardness of the abrasive, etc., can be varied to produce glosses ranging from 60 – 70 down to 3 – 5 depending upon the effect desired. Although such surfaces are flat, they are not smooth on a micro-scale, hence they scatter and diffuse light and make the laminate surface appear more and more gray as the intensity of the scratching produces lower and lower gloss.

4. Abrading the surface of the press plate creates a similar effect. However, the resulting laminate surface is even grayer than if it were directly abraded. This is probably due to tiny fractures of the laminate surface as it is pulled away from the press plate. In order to reproduce the abraded marks in the plate, the melamine must flow into every detail of these crevices. Since the resin then becomes thermoset, a certain amount of fracturing occurs as the laminate surface is extracted. These additional fractures cause even more light scattering and increase the grayness.

5. A very efficient procedure for producing a low gloss on metal is to blast it with sand or similar abrasive particle. Sand is characterized by sharp, angular cutting edges which either occur due to the natural crystalline habit of the mineral or the fracture of the original mass from which the particles were generated. In any case, "sand" produces a metal surface which is not microsmooth unless care is taken to see that an extremely light cut is obtained. For instance, a mirror-finished 410 stainless steel plate will have a roughness of 1 – 2 microinches and will produce a laminate of 80 gloss units with about the same roughness. The laminate will appear polished and clear. If the mirror-finished plate is now lightly blasted with sand, the plate roughness will be slightly increased to about 3 – 4 microinches and the gloss of the plate will be about 78 units. If a laminate is pressed from this plate, its gloss will be about 20 units and it will take on a grayer color than that pressed from the polished plate. This degree of grayness has previously been tolerable in commercial applications since no means of eliminating it was known. By continuing to blast the plate with sand, the roughness may be increased to about 5 microinches and the gloss reduced to about 10 units. At this point, the laminate pressed from it will have a similar roughness, but a gloss of only about 2 units. The resultant grayness, however, is unacceptably evident, a definite change in color is noticeable and the printed pattern (if one is used) is distinctly reduced in sharpness and clarity. Thus sand is not a suitable medium to increase the texture of a plate and/or laminate while still retaining optical clarity and fidelity at the normal gloss desired. The use of "grit" gives the same results as described above for sand and for the same reasons. The above-disclosed "Metals Handbook", p. 364, states that "Grit consists of angular metallic particles (usually crushed hardened cast steel . . .) with high cutting power".

6. Metals can be etched to reduce their gloss, but this treatment also results in a surface condition which is not microsmooth due to the varying rates at which the metal reacts locally which is further influenced by its crystalline structure and purity. Laminates pressed from etched plates cannot be reduced to low gloss levels without development of severe graying or haze.

In order to control the gloss and texture of laminates made from press plates while concurrently reducing laminate grayness and mottle to a minimum, it is necessary to know the relationship between the plate roughness and gloss and that of the laminate produced from it. It has been found that high pressure melamine laminates reproduce the surface against which they are molded with very high fidelity. For instance, microscopic examination of laminates made from polished plates will reveal the replicas of very tiny scratches remaining in the press plate even after polishing. Robertson, in the above-cited reference, shows photomicrographs of this surface by the decorative laminate. I have also found that a given textured press plate and the laminate produced from it have approximately the same roughness.

I have also discovered that the gloss produced on the laminate can be predicted if the gloss of the press plate is known. Table I, below, shows measurements made on a series of textured press plates and the laminates made from them.

TABLE I

60° GARDNER GLOSS ON 410 STAINLESS STEEL PLATES AND ON LAMINATES PRESSED FROM THEM

| Laminate | Plate |
|---|---|
| 1.1 | 4.5 |
| 1.2 | 6.5 |
| 1.8 | 6.0 |
| 1.6 | 6.5 |
| 2.5 | 9.5 |
| 2.6 | 12.0 |
| 5.9 | 28.0 |
| 8.2 | 38.0 |
| 8.4 | 42.0 |
| 10.3 | 50.2 |
| 10.8 | 50.0 |
| 11.1 | 54.0 |
| 12.4 | 58.0 |
| 14.8 | 67.0 |
| 17.0 | 74.0 |
| 19.0 | 86.0 |

It can be seen that the correlation between gloss on the plate and gloss on the laminate is very high. In this case the coefficient of correlation, ("Handbook of Industrial Statistics", Bowker & Lieberman, Prentice-Hall, Inc., Englewood Cliffs, N.J. (1955), Pg. 895), is over 0.99, indicating statistical significance at the 0.001 level. It should be noted that these data were gathered on press plates made by various means, not only by peening with shot. Thus, the correlation between the gloss of the press plate and that of the laminate is independent of the topography of the surface. Thus, some of the plates, which were not made by rounded indentors, yielded laminates which were too gray. Therefore, the instrument of impaction is important to eliminate grayness, but it does not influence the high correlation between plate gloss and the resulting laminate gloss.

In measuring the plate gloss, it is necessary that the surface be clean and free from (1) dust developed during the texturizing process, (2) oxide film or (3) other contaminants which might be present. I have found that cleaning of the surface with metal cleaners designed for household use gives highly reproducible gloss measurement of textured 410 stainless steel plates. Two suitable commercial cleaners are "PENNYBRITE ®" from North American Chemical Organization, Camby, Indiana 46113, and "TWINKLE ®" from Drackett Products Company, Cincinnati, Ohio. In cleaning the plate, the surface should be flooded with water so that good solution of the cleaning paste occurs and that chemical cleaning may take place. The plate gloss is measured with a Gardner 60° gloss meter. On very glossy plates the meter may read off scale. This can be compensated for by setting the meter to a lower point than called for on the standardizing ceramic placque. For instance, I have set the point "60" on the scale for standard reading "92". Thus plate glosses over 100 can be measured if necessary. This will not be likely on plates within the roughness range of interest herein.

The gloss of the laminate is also related to the roughness of the press plate as shown in Table II, below.

TABLE II

ROUGHNESS (AA) ON PEENED 410 STAINLESS STEEL PLATES VS. 60° GARDNER GLOSS ON LAMINATES PRESSED FROM THEM

| Laminate Gloss Gardner Degrees | Plate Roughness Microinches |
|---|---|
| 4.3 | 127.5 |
| 4.7 | 130.0 |
| 4.7 | 119.0 |
| 4.8 | 116.3 |
| 4.8 | 131.6 |
| 5.1 | 114.7 |
| 5.1 | 113.7 |
| 5.5 | 117.9 |
| 5.5 | 113.3 |
| 6.0 | 112.0 |
| 7.1 | 84.7 |
| 7.3 | 86.9 |

Again, a high degree of correlation is found. The coefficient of correlation is −0.89 (negative because gloss decreases with increasing roughness).

The roughness on plates and laminates is measured on a Gould profilometer SURFANALYZER, Model 150. It is expressed as the arithmetic average (AA) roughness, which is the average usually generated by profilometer instruments. The older literature often quotes root means square average (RMS). The RMS is about 11% higher than the AA, ("Surface Texture", (ASA B46.1-1962) Am. Soc. of Mechanical Engineers, New York. N.Y. Pg. 16).

From FIGS. I and II, it can be seen that the plate gloss and plate roughness are linear functions of the laminate gloss. Therefore, all three can be represented as a straight line in 3-dimensional space.

It will be understood that the preferred procedure for the preparation of press plates suitable herein is to peen 410 stainless steel plates having an original surface roughness (AA) of from about 2 to about 20 with cast iron or steel shot by means of commercially available peening machines to yield a surface of approximately spheroidal, internally smooth craters, such plate having a surface roughness (AA) from about 30 to about 200 microinches and a Gardner gloss of from about 20 to about 100 units. The shot should be chosen from sizes about S-70 up to S-780 (radii of curvature 0.003 inch to 0.039 inch). However, any hard metal may be used to produce the plates such as carbon steel, iron and the like.

It will sometimes be found that although the scale of the textured design, i.e., roughness, is that which is desired, the gloss produced on the laminate may be higher than desired. By reference to the relationship of Plate Gloss vs. Laminate Gloss, one can determine the plate gloss necessary to produce the laminate gloss desired. One may then reduce the gloss of the peened plate, preferably by carefully overpeening it with shot which is substantially smaller in diameter than that used in the original peening. For instance, a plate peened with S-380 shot might be overblasted with S-70 of S-110 shot to reduce its gloss without changing the scale of the texture or roughness. The gloss may also be reduced by overblasting very lightly with sand or similar sharp particles. Unless this is done with extreme care, however, the problem of grayness will again be encountered as is typical with sharp particles.

It is noteworthy that the above technique overcomes a critical process limitation recognized by Beeson in U.S. Pat. No. 3,526,558, wherein it is stated that plates with a roughness greater than 150 microinches RMS (equal to about 133 microinches AA) do not release cleanly from laminates. We have found that peened press plates with a roughness as high as 200 AA (equivalent to 222 RMS) over substantially the complete plate surface will release readily when used with common release agents such as zinc stearate powder, and the like. Those familiar with the laminating art will recognize that, contrary to the impression given by Beeson, any metal plate must have a release agent of some type on its surface, otherwise the laminate will adhere to the clean metal surface. The release agent may be of a rather permanent type such as certain silicones or fluoropolymers, or of the more transient type such as zinc stearate which is renewed after every few pressings. The plates of Beeson, however, must have a substantial portion of their surface free from roughness, i.e., there are glossy portions and rough portions on the plate surface.

The high pressure laminates of my invention are comprised of from about 6 – 9 or more phenol/formaldehyde resin impregnated cellulosic sheets such as kraft paper sheets, asbestos sheets and mixtures thereof as a supporting base member having thereon a decor or print sheet, as described above, and preferably an outer overlay sheet which is also impregnated with a melamine/formaldehyde resin. The low pressure laminates contain a particleboard substrate rather than the cellulosic core sheets of the high pressure laminates, a print sheet and, optionally, an overlay sheet.

The laminates are produced by heat and pressure consolidating the laminate components with the textured surface of the low relief, peened press plate adjacent the decor sheet side of the supporting base member under conditions of temperature and pressure known in the art, i.e., 145° to 165° C. and 200 psi to 350 psi for the low pressure laminate, and 130° to 150° C. and 1000 psi to 1700 psi for the high pressure laminates.

The laminates produced according to my novel process can be used as such for decorative purposes, e.g., desk tops, wall panels, furniture, etc., or can be used as masters, copy masters, etc. in the production of other decorative laminates to thereby save the press plate from wear and tear or accidental damage. The laminate masters also produce decorative laminates of excellent appearance with exact color and gloss fidelity which are free of grayness and mottling.

The following examples are set forth for purposes of illustration only and are not to be construed as limitations on the present invention except as set forth in the appended claims. All parts and percentages are by weight unless otherwise specified.

EXAMPLE 1

A 410 stainless steel plate, about 0.070 inch thick, is subjected to a commercial peening operation using S-330 steel shot (radius of curvature 0.0165 inch) to produce a roughness (AA) of 110 microinches uniformly over its entire surface. It has been previously established, from measurements on laminates made from aluminum foil - kraft paper caul stock, that the required roughness of the plate was 90 ± 20 microinches in order to give the laminate texture required for commercial acceptance.

The plate is used to make a conventional high pressure laminate by arranging appropriate layers of paper against it as follows:

1. The press plate with its textured surface facing downward. The plate is first sprayed with Releaseagen H-15, a non-silicone release agent made and sold by General Mills, Minneapolis, Minnesota. It was then wiped clean and lightly dusted with zinc stearate powder.

2. A conventional overlay paper consisting of 28 lb. basis weight, pure α-cellulose sheet impregnated with about 64% of a commercial melamine laminating resin of about 2 formaldehyde/1 melamine mole ration. The volatile content of the overlay paper is about 5%.

3. A conventional pigmented decor paper bearing a wood-grain print, facing upward, and impregnated with about 40% of a commercial laminating resin similar to that in the overlay. The volatile content of this sheet is also about 5%.

4. Five piles of a 115 lb. kraft saturating paper of a commercial type, containing about 25% of a conventional phenol/formaldehyde laminating resin with a ratio of about 1 phenol : 1.5 formaldehyde. Volatile content is about 5%.

5. A layer of glassine paper to act as a release sheet. The entire assembly is then repeated in inverted order to produce a so-called "back-to-back" assembly, whereupon it is fitted with conventional layers of cushion paper on the outside surfaces of the stainless steel press plates, the entire assembly then sandwiched between appropriate cold rolled steel plates and placed into a conventional high pressure laminating press. A pressure of 1400 psi is applied to the assembly. It is heated to 142° C. in about 25 minutes and held at that temperature for 12 minutes. The entire assembly is then cooled to room temperature and withdrawn from the press and the laminates extracted from the assembly.

The gloss of the plate is found to be 54.0 units on a Gardner 60° Gloss meter, while the laminate pressed from the plate has a gloss of 10.5 units. This is in substantial agreement with the relationship presented in Table I, above. All the other properties of the laminate are excellent. The laminate exhibits no grayness or mottle.

EXAMPLE 2

Another plate is peened with S-330 shot as in Example 1 to produce a plate of the same character; namely, roughness 110 microinches, gloss 54.0. This plate is sent through a commercial sand blasting machine which operates with a throwing wheel in a manner identical to the peening machine used to throw the S-330 shot. That is, the plate is "blasted" very softly with sand particles instead of actual rounded shot. Sand particles, or course, are sharp and not rounded like shot, and will produce a "grayness" in a laminate pressed from a plate too strongly overblasted with sand or grit. By useful adjustment of the machine the plate gloss is reduced to 29.0 gloss units. When a laminate is pressed from this plate, it produces a laminate of gloss 5.9 units. The roughness of the plate is not measurably changed by the sand overblast. The laminate is free from mottle and grayness. The roughness of the plate is not measurably changed by the sand overblast. The laminate is free from mottle and grayness. The roughness of the laminate is 108 microinches; it is sufficiently similar to laminates pressed on aluminum-kraft caul stock to be acceptable commercially.

EXAMPLE 3 (Comparative)

The plate of Example 2 is further overblasted with sand until its gloss is about 7. A laminate pressed from this plate has a 60° gloss of 0.5-1. It presents a "dead matte" finish and exhibits a pronounced grayness and substantial diminution in sharpness of the print used on the decor sheet. The roughness of the plate is 106 microinches.

The above result shows that the gloss of a plate (and the gloss of a laminate pressed from it) can be substantially changed without materially changing the texture (i.e., average, coarse roughness) and that low gloss plates do not produce satisfactory laminates.

EXAMPLE 4

Using a 410 stainless steel press plate which originally had a mirror finish and which had been overblasted in a commercial peening device to obtain a plate gloss of 79 and a plate roughness (AA) of 36 microinches using S-70 steel shot (radii of curvature 0.0035 mesh) only, a laminate is pressed as in Example 1. The resulting laminate has a gloss of 8.0 and a roughness (AA) of 34 microninches. This laminate strongly resembles those which are pressed from aluminum-litho paper caul stock. That is, if one uses matte-finished 0.5 mil aluminum foil which has been bonded to coated litho paper, the resulting laminate will have a gloss of 10–11 and a roughness (AA) of 40–45.

EXAMPLE 5

410 stainless steel plates 18 inches × 20 inches × 0.070 inch are blasted with iron shot in sizes S-110, S-230, S-390 and S-550 (radii of curvature 0.005 inch, 0.0115 inch, 0.0195 inch and 0.0275 inch, respectively) to produce a uniform texture over the entire surface of each plate. The plates are then used to produce solid color black laminates in the manner of Example 1. To produce a solid color, the decor assembly, consisting of 1 sheet of overlay paper and 1 sheet of the wood-grain printed paper of Example 1, is replaced with a single sheet of 90 lb. black decor paper, 3000 ft.² ream, impregnated with melamine/formaldehyde resin to about a 45% resin content; otherwise the procedure is unchanged.

Measurements on the plates and laminates reveal the following:

| Size No. | AA Roughness Microinches | Gardner 60° Gloss Plate | Laminate |
|---|---|---|---|
| S-110 | 91 | 21.5 | 4.0 |
| S-230 | 129 | 23.4 | 4.7 |
| S-390 | 158 | 29.5 | 5.7 |
| S-550 | 187 | 29.0 | 6.0 |

The laminates have a rich black appearance which changes very little with the angle of view. There is no evidence of mottle.

When the plates are viewed through a stereo microscope at magnifications of about 10X to about 60X, the surface can be seen to consist of craters which are spherical segments of radius similar to that of the shot used for peening. The intersections of these spherical segments are seen to be rounded and without sharp edges. The topography resembles that of a rolling, hilly terrain. No fragments of the decor laminate paper are seen on the surface of the plate.

EXAMPLE 6 (Comparative)

From the screen analyses used to classify iron shot and grit, it is possible to select some of each type which are approximately the same in particle size. With reference to the shot sizes described in Example 5, the following approximate equivalents can be noted:

| SAE Shot Size No. | All Pass Opening (Inches) | SAE Grit Size No. | All Pass Opening (Inches) |
|---|---|---|---|
| S-110 | .0232 | G-50 | .0280 |
| S-230 | .0394 | G-40 | .0394 |
| S-390 | .0661 | G-16 | .0661 |
| S-550 | .0787 | G-14 | .0787 |

410 stainless steel plates are blasted with G-50, G-40 and G-16 grits in a manner similar to that of Example 5 using a similar blasting machine and adjusting the control parameters to apply the same energy to the particles as they leave the throwing wheel. Thus the only substantial difference is in the shape of the abrading particles, all other factors being maintained constant. Again, solid color black laminates are made and the following data obtained therefrom:

| SAE Grit Size No. | Laminate AA Roughness (Microinches) | Gardner 60° Gloss Plate | Laminate |
|---|---|---|---|
| G-50 | 200 | 2.9 | 0.6 |
| G-40 | 222 | 3.0 | 0.5 |
| G-16 | 261 | 5.8 | 1.1 |

By comparison with the data of Example 5, it is seen that grit particles of a size corresponding to similar shot particles give a very different roughness and gloss. That is, S-110 shot gives a roughness of 91 microinches whereas the corresponding grit particle (G-50) gives a roughness of 200 microinches; likewise S-230 shot gives 129 microinches and the corresponding grit gives 222; S-390 shot gives a roughness of 187 microinches and G-16 shot gives 261.

As expected, the gloss measurements on the plate and laminate are correspondingly low. In fact, the gloss readings on the laminate are essentially beyond the range in which the glossmeter can be read with reliability.

When viewed from a position normal to the plane of the laminate, the color thereof appears to be reasonably black, but as the angle of view is changed, the color varies through many shades of gray until the angle of view is about 30° relative to the plane of the laminate. At this point, the color appears to be a very light gray and can no longer be reasonably described as black. Of course, similar color distortions would be observed if the laminate were used on furniture tops and they would be highly objectionable to the makers and users of such furniture.

When the plates are examined under the stereomicroscope, the indentations are found to be irregular and varied. However, they can reasonably be described as intaglio impressions of sections of pyramids, corners of cubes, or sections of tetrahedrons; all characterized by sharp edges which occur along the intersections of the approximate planes which comprise the faces of these intaglio impressions. This can be easily understood by examining large grit such as G-10 or G-12 which show these sharp edges to the unaided eye. Corresponding shot sizes, S-780 or S-660 (radii of curvature 0.0390 and 0.033, respectively), appear to be rather uniform spheres and resemble lead shot used in shotgun cartridges and the like.

The plate also contains many fragments of the black laminate surface which are so completely forced into every fissure of the plate topography that they are more easily broken away from the laminate than extracted from the crevasses. This, or course, changes the topography of the plate since many of the valleys are filled up and no longer "print" on subsequent pressings. A further risk exists that some of these fragments might break loose on subsequent pressings and contaminate laminates of contrasting color. For instance, black solid color followed by a pale yellow solid color.

Finally, it is noted that the plate is not completely abraded over its entire surface on a microscopic scale, but that some portions of the original plate surface remain undisturbed. For instance, consider a grit particle which has the approximate shape of a regular tetrahedron. Such a particle will leave indentations whose projection on the plane of the original plate will be triangles. The plate blasted with G-16 grit shows triangles whose sides varied from about 0.005 inch to about 0.015 inch. Adjacent to the depression is an undisturbed area of irregular shape and about twice as large. This area retains the original high gloss of the plate. As the grit sizes become larger, the undistrubed areas also occupy a larger fraction of the total area of the plate. It is for this reason that the apparent anomaly between laminate gloss and plate roughness is observed. That is, as the grit size becomes larger, G-50 to G-40 to G-16, the roughness of the laminate hence the plate also) becomes greater. This is to be expected. At the same time, however, the plate gloss and the laminate gloss become greater. One would expect the gloss to become less with increasing roughness.

The apparent explanation is that the roughness becomes greater as the larger grit particles produce larger and deeper impressions in the plate; this would tend to make the gloss go down. At the same time, however, the total fraction of the original area which remains undisturbed becomes greater because the larger grit particles form a coarser pattern as they strike the plate. The undisturbed surfaces have a high local gloss (that of the original plate) and hence reflect more light to the gloss meter sensor. The effect of the greater undisturbed area is slightly greater than that of the deeper impressions so that the gloss rises slowly with increasing grit size. This can be overcome by abrading for longer times or with greater throwing energy in order to reduce further the cumulative undisturbed area. The gloss becomes extremely low and the graying even more pronounced under these circumstances.

EXAMPLE 7

Two peened 4 foot × 8 foot plates, prepared as in Example 2, are clamped into a 4 foot × 10 foot Siempelkamp, fast closing hydraulic press fitted with stream platens. The press is heated to 160° C. platen temperature which is maintained at thermal equilibrium. An assembly consisting of a dry print sheet impregnated with a low-pressure melamine/formaldehyde laminating resin is overlaid face-up upon a ¾ inch thick, 45 lb./ft.$^3$ density, 3-layer particleboard. A similar print sheet is placed beneath the particleboard, face down. The assembly is moved into the heated press, each face of the assembly contacting one of the peened plates. The press is closed and a pressure of 350 psi is maintained over the entire assembly surface for 60 seconds. The press is then opened. The assembly releases easily from the plates. The two board surfaces exhibit roughness and gloss values substantially the same as the laminate of Example 2.

I claim:

1. A process for the production of a textured decorative laminate which is substantially free of grayness and mottling which comprises heat and pressure consolidating an assembly comprising, in superimposed relationship, a supporting base member, a melamine-formaldehyde resin impregnated decorative, cellulosic sheet and a peened metal press plate having a texture over substantially its entire surface, the textured surface of said plate facing said sheet and having an arithmetic average roughness of from about 30 microinches to about 200 microinches, a Gardner Glossmeter 60° gloss of from about 20 to about 100 and comprising a myriad of craters having radii of curvature of from about 0.003 to about 0.050 inch, said texture having been provided by (1) first peening said surface with large size shot and then with smaller size shot or (2) first peening with shot and then carefully blasting with grit.

2. A process according to claim 1 wherein said plate is stainless steel.

3. A process according to claim 1 wherein said supporting base member comprises particleboard.

4. A process according to claim 1 wherein said supporting base member comprises a plurality of resin impregnated cellulosic sheets.

* * * * *